Patented July 19, 1927.

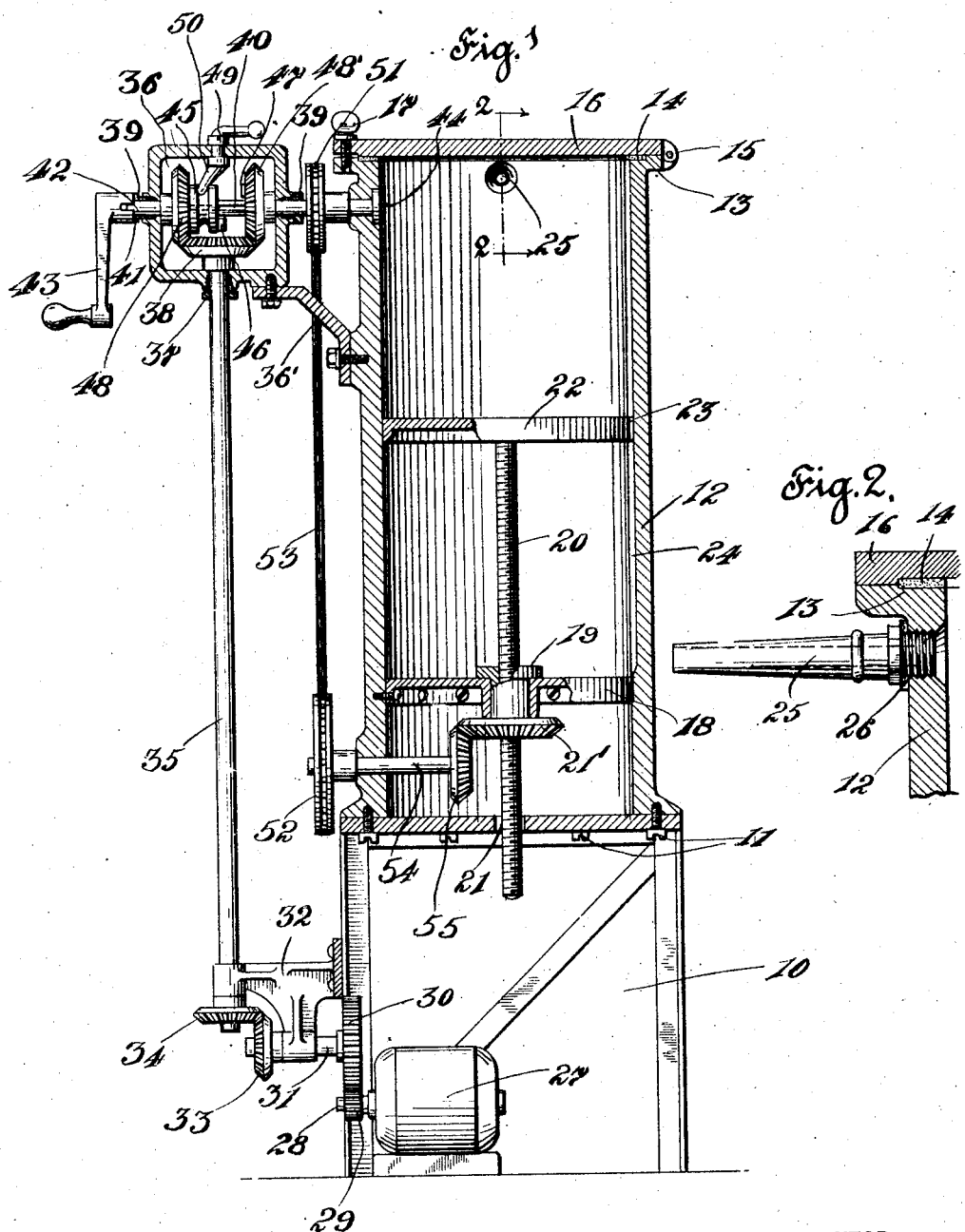

1,636,424

UNITED STATES PATENT OFFICE.

THOMAS LUTOSTANSKI, OF WAYLAND, MICHIGAN.

SAUSAGE-STUFFING MACHINE.

Application filed March 11, 1926. Serial No. 93,855.

This invention relates to meat machines and more particularly to a device used to fill the skins of sausages.

The object of the invention is the provision of a device of the class described that is either manually or electrically operated.

Another object of the device is to provide means whereby the machine can be operated in reverse direction when it is desirous to refill the same with a fresh supply of the material used in the sausages.

These and other objects are accomplished by the novel construction, combination and arrangement of parts, hereinafter described and illustrated in the accompanying drawing, in which:—

Figure 1 is a transverse partial sectional view of the device made in accordance with the invention.

Figure 2 is a fragmentary partial sectional view taken on line 2—2 of Figure 1, drawn to an enlarged scale.

Referring more in detail to the drawing:—

The numeral 10 generally designates a hollow square base having mounted on it, by screws 11, a cylindrical magazine 12 having a flanged rim 13 to receive packing 14.

Hinged on the container 12, at 15, is a cover 16, having at its front a wing screw 17 to engage the flange 13 and thus hold the cover down tightly.

Rigidly attached within the magazine 12 near its bottom is a plate 18 having an opening centrally located thereon in which is secured a bearing 19 through which passes a threaded rod 20 extending through an opening 21, in the bottom wall of the magazine, into the hollow base 10.

Revolvably mounted on the screw 20, flush against the under side of the bearing 19 is a bevel gear 21' having internal threads to engage the screw 20 and fixed to the top end of the screw is a piston 22 having a lug 23 extending from its rear to engage in a slot 24 in the container 12 to prevent the piston from rotating due to the action of the gear 21'.

Screw threaded in the outer periphery of the container 12 near the top is a nozzle 25 over which the skin of the sausage is placed when the same is to be filled. The joint made by the nozzle and magazine is tightly sealed by a packing 26.

Set in the base 10 is an electric motor 27 of a conventional type having on its shaft 28 a pinion 29 meshing with a spur gear 30 mounted on a rod 31 journalled in an arm of a bracket 32 fixed on the outer wall of the base 10.

Mounted on the other end of the rod 31 is a bevel gear 33 meshing with a mating gear 34 attached to a shaft 35 journalled in the other arm of the bracket 32.

The upper end of the shaft 35 enters an oil-filled gear box 36 through a bearing 37 and has mounted at its end a bevel gear 38, the box 36 being mounted on a bracket 36', set in the front wall of the container 12.

Journalled at opposite sides in bearings 39 in the box 36 is a slotted rod 40, extending beyond the box and having at one end a pin 41 to engage a recess 42 in a removably engageable crank handle 43, the other end being revolvably set in the front wall of the magazine 12, as at 44.

Slidably mounted on and keyed in the slot of the rod 40 is a clutch 45 having projections 46 on its faces to engage projections 47 on facing bevel gears 48 and 48' revolvably mounted on the rod 40 on opposite sides of the gear 38.

Revolubly set in the top wall of the box 36 is a handle 49 having a crank 50 to engage the clutch 45.

Fixed on the rod 40 intermediate the box 36 and the front wall of the container 12 is a sprocket wheel 51 driving a similar wheel 52 by a chain 53, the last named wheel being mounted on a rod 54 journalled in the front wall of the magazine and having attached at its other end, within the magazine, a bevel gear 55 meshing with the gear 21'.

The device, as shown in Figure 1, is hooked up for operation by the motor 27, the clutch 45 being engaged with the gear 48. If the device is to be manually operated the clutch is placed in neutral, in other words, somewhere between the gears 48.

In operation, the shaft 35 revolves by engagement with the motor 27 through the train of gears shown. This action revolves the rod 40 because of the same being connected by the keyed clutch 45 to the gear 48. This in turn, by the sprocket wheels 51 and 52, and the chain 53, turns the rod 54 connected to the bevel gear 21' which is internally threaded. By revolving the gear 21', which engaged the threaded screw 20, the screw 20 is caused to rise in an obvious manner, thus forcing the meat, above the piston 22 in the magazine 12, to find an outlet, since the cover 16 is tightly closed. The skin to be used in the sausage is placed over the nozzle 25 and is filled by the meat that is being forced out of the container through the nozzle.

When the magazine 12 is empty, the clutch 45 is moved to engage the opposite gear 48', thus causing the machine to operate in reverse direction and lowering the piston 22, so that the container may be refilled.

Having thus described my invention, what I claim as new and desire to secure by Letters Patent, is:—

A sausage stuffing machine comprising a base, a unitary cylinder mounted on said base, a piston in said cylinder, means to prevent rotation of said piston, a gear box on said cylinder, facing bevel gears in said box, a clutch intermediate said gears, a motor in said base, connections between said motor and gear box and connections between said gear box and said piston.

In witness whereof I have affixed my signature.

THOMAS LUTOSTANSKI.